United States Patent

[11] 3,627,953

[72] Inventor George P. Houcke
Rumson, N.J.
[21] Appl. No. 825,623
[22] Filed May 19, 1969
[45] Patented Dec. 14, 1971
[73] Assignee Bell Telephone Laboratories, Incorporated
Murray Hill, N.J.

[54] LINE SCANNER CIRCUIT FOR DATA CONCENTRATOR
4 Claims, 1 Drawing Fig.

[52] U.S. Cl. .......... 179/18 FG
[51] Int. Cl. .......... H04g 3/24
[50] Field of Search .......... 179/18 FF, 18 FC, 18 FG, 18 E, 18 AH

[56] References Cited
UNITED STATES PATENTS

| | | | |
|---|---|---|---|
| 1,363,268 | 12/1920 | Powell | 179/18 .6 |
| 1,837,801 | 12/1931 | Vick et al. | 179/18 .6 |
| 1,924,661 | 8/1933 | Stehlik | 179/18 .6 |
| 2,853,555 | 9/1958 | Abbott, Jr. et al. | 179/18 FC |

*Primary Examiner*—Kathleen H. Claffy
*Assistant Examiner*—Randall P. Myers
*Attorneys*—R. J. Guenther and Kenneth B. Hamlin

ABSTRACT: Bidding data station lines and idle trunks are interconnected by way of a switch matrix. Line and trunk scanners are provided to hunt for bidding lines and available trunk, respectively. When a trunk scanner locates an available trunk, it locks on the trunk and stops hunting. The line scanner is arranged to hunt for a bidding line without regard to the availability of a trunk. When no trunk is available, the line scanner locks on the first bidding line it locates to provide pseudoqueueing by serving the bidding line first when a trunk becomes free.

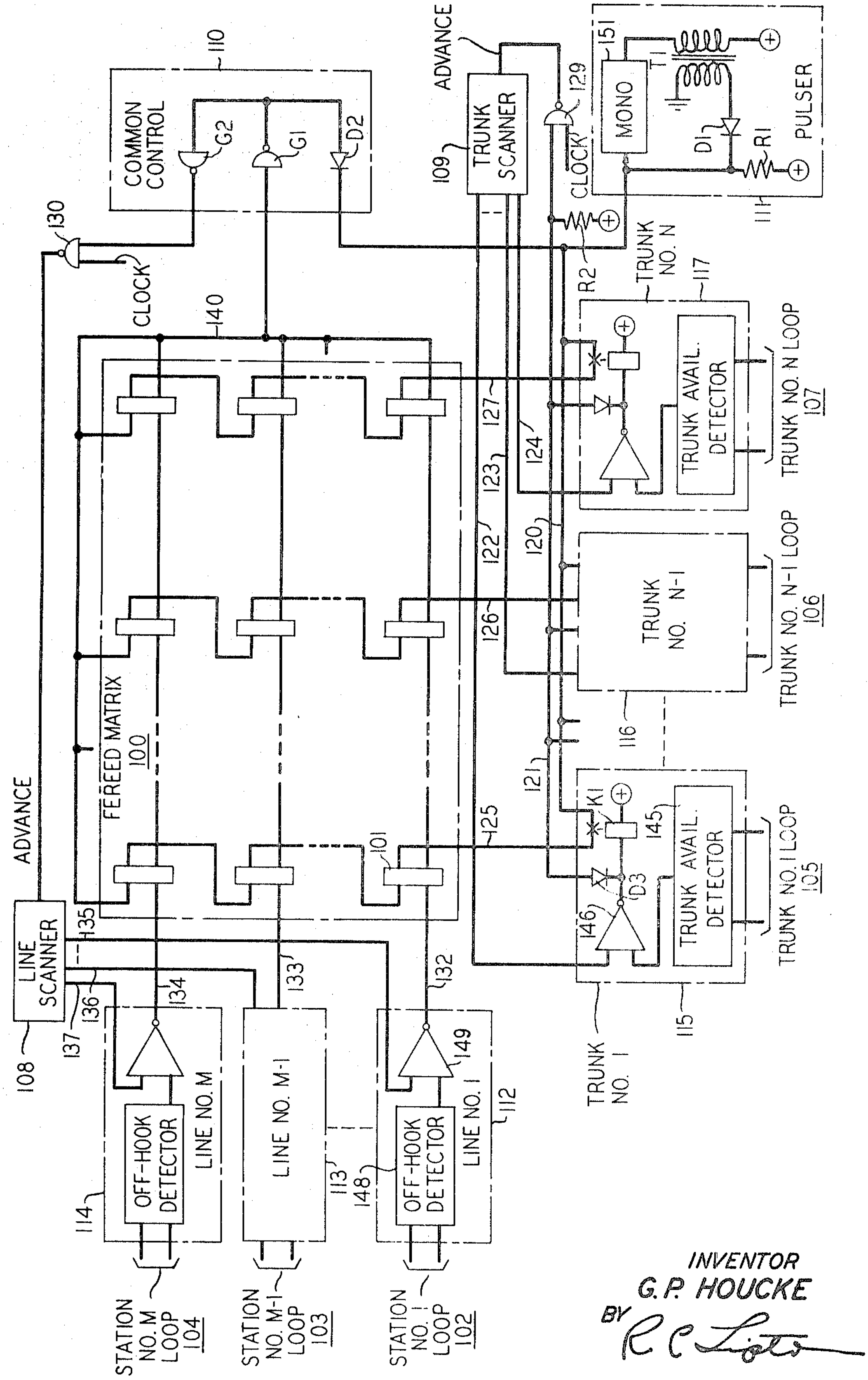
INVENTOR
G. P. HOUCKE
BY R C Ligo
ATTORNEY

LINE SCANNER CIRCUIT FOR DATA CONCENTRATOR

FIELD OF THE INVENTION

This invention relates to line scanners that hunt for station lines which are bidding for access to trunks and, more particularly, to line scanners arranged to scan or address station lines sequentially.

DESCRIPTION OF THE PRIOR ART

In communication systems which involve a plurality of station lines, it is often desirable to provide a transmission link which comprises a plurality of trunks fewer in number than the number of station lines. The trunks are shared by the stations, any station line being capable of seizing an idle trunk when the station desires to transmit over the transmission link. The circuitry for providing seizure, sometimes called a concentrator, generally includes a trunk scanner for hunting for available trunks, a line scanner for hunting for station lines that are bidding for trunks and a switch matrix for interconnecting the bidding line and idle trunk to thereby render the line nonbidding and the trunk unavailable.

There are many different arrangements which provide line and trunk scanning. One of the schemes which has economy and simplicity in circuitry and reliability in operation is the sequential scanner. This scanner may comprise a standard counter (binary or ring) which sequentially addresses lines (or trunks) with each advance of the count. For example, in accordance with one arrangement, a sequential trunk scanner addresses and thereby scans each trunk until an available trunk is located, whereupon the advance of the counter is halted and the scanner thus locks on the available trunk. This enables the advance of a sequential line scanner which thus hunts for a bidding line (as indicated by the "off-hook" condition of the remote line station). When a bidding line is located, the switch matrix interconnects the line and the trunk, the trunk becomes "busy" or unavailable and the advance of the trunk scanner is resumed.

Sequential scanners and, more particularly, sequential line scanners have the advantage that after each line is addressed, all other lines must be scanned before the line is again addressed. However, the order of the arrival of service requests by the lines is not kept. This can be a disadvantage when all the trunks are unavailable, having been seized by the lines. In this event, a line denied service because the last idle trunk is seized may be preempted by the intervening lines which make subsequent bids after the seizure of the last trunk when these intervening lines are prior to the denied line in the scanning sequence.

SUMMARY OF THE INVENTION

It is an object of this invention to provide sequential scanning with pseudoqueuing. It is more specifically an object of this invention to provide that the next free trunk will be seized by a line making a bid prior to the seizure of the last trunk available rather than by an intervening line making a bid subsequent to the seizures.

It is a feature of this invention, that the line scanner advance is continued, when no trunk is available for seizure, until a bidding line is located. The advance is thereupon halted whereby the scanner "camps-on" the bidding line to give the line first service when a trunk becomes free.

In accordance with an illustrative embodiment of this invention the line scanner advance is resumed, independently of the availability of a trunk, if a nonbidding line is addressed and is also resumed if a bidding line is addressed and a trunk is concurrently available. The scanner will therefore continue to advance until a bidding line is located and no trunk is available to the bidding line for seizure. Advantageously, the advance of the scanner is controlled by a logic circuit which is (1) directly coupled to the line outputs and arranged to detect the scanning of a nonbidding line and (2) coupled through switch means in each trunk to the line outputs and arranged to detect the scanning of a bidding line, the switch means being arranged to extend the coupling to the line outputs when the associated trunk is available.

BRIEF DESCRIPTION OF THE DRAWING

The foregoing and other objects and features of this invention will be fully understood from the following detailed description of an illustrative embodiment taken in conjunction with the accompanying sale figure which shows, in schematic form, various circuits and equipment of a concentrator for interconnecting data station lines and data trunks and the line and trunk scanning circuits therefor in accordance with this invention.

DETAILED DESCRIPTION

The concentrator shown in the drawing includes a "crosspoint" matrix generally indicated by block 100, a plurality of station line loops such as line loops 102 through 104 and plurality of trunk loops represented by loops 105 through 107. As described hereinafter, it is the function of matrix 100 to connect a bidding station to an available trunk, that is, to connect the station line loop to the trunk loop when the station (not shown) which terminates the station loop goes off-hook and the trunk loop has not been seized by any other station. The concentrator also includes line circuits 112, 113, and 114 which terminate station loops 102, 103 and 104 respectively. There is also included at the concentrator, trunk circuits 115, 116, and 117 which are connected to trunk loops 105, 106, and 107 respectively. Finally, the concentrator includes line scanner 108, trunk scanner 109, a common control circuit 110, pulser 111 and a common clock pulse generator (not shown).

Each of the trunk circuits is arranged in substantially the same manner. It is the function of the trunk circuit to examine the trunk loop connected thereto and determine whether or not the trunk loop is available, that is, whether or not the trunk loop is presently connected to a station loop. In accordance therewith, the trunk circuit, when scanned, provides and prepares certain conditions indicating whether or not the corresponding trunk loop is available.

Trunk circuits 115 through 117 are connected to matrix 100 by way of leads 125 through 127 and are connected to trunk scanner 109 by way of leads 122 through 124. In addition, the trunk circuits are connected to common leads 120 and 121, which leads are normally in a high potential condition. Considering trunk circuit 115, in the event that trunk loop 105 is available trunk circuit 115 stores this indication in anticipation of being scanned by trunk scanner 109. When the scanning occurs, lead 122 is pulsed by trunk scanner 109 and, with the available condition indication stored in trunk circuit 115, the high potential source applied to lead 121 by way of resistor R2 is removed and leads 125 and 120 are interconnected. In the event that trunk loop 105 is not available, trunk circuit 115 does not modify the conditions of leads 120 and 121 whereby lead 120 is not connected to lead 125 and the normal positive potential is maintained on lead 121 by way of resistor R2.

As previously indicated, trunk scanner 109 successively scans the several trunk circuits by sequentially pulsing leads 122 through 124. Trunk scanner 109 may comprise any conventional counter type circuit. The advance of the circuit is provided by the input advance lead, as shown in the drawing, which lead extends to the output of gate 129. One input to gate 129 is provided by lead 121 and the other input extends to the output of the common clock pulse generating circuit. As previously described, lead 121 is normally in a high condition except when a trunk circuit having an available trunk loop is being scanned. In this high condition, gate 129 is enabled to pass clock pulses, which clock pulses are utilized as the advanced pulses for trunk scanner 109. Trunk scanner 109 therefore is enabled to advance and thus scan the successive trunk circuits until a trunk circuit having an available trunk loop is scanned. Thereupon, as previously described, the potential on lead 121 is removed by the trunk circuit. Gate 129 is thereupon disabled and the advance of scanner 109 is terminated. Trunk scanner 109 then resumes its scan when a bidding station line loop is connected to the trunk loop to render the trunk loop unavailable, as described in detail hereinafter.

The addressing or scanning of the line circuits is provided by line scanner 108. Line scanner 108 may comprise a conventional counter advanced by pulses on the incoming advance lead which is connected to the output of gate 130. One input lead to gate 130 is connected to the output of the common clock pulse generating circuit and the other is connected to common control 110. Thus common control 110 enables or disables gate 130 to control the passage of clock pulses to the advance lead of line scanner 108. Line scanner 108 thus advances to scan the various line circuits under the control of common control 110. This control is more specifically described hereinafter.

Each of the line circuits is arranged in substantially the same manner and functions to examine the associated station line loop and store designation as to whether the station connected to the loop is off-hook and bidding for a trunk or conversely is either on-hook or connected to a trunk loop and therefore not bidding for a trunk loop. Scanning of the line circuits is provided by line scanner leads 135 through 137 which leads extend from line scanner 108 to line circuits 112 through 114, respectively.

The output of the station line circuits is provided to output leads 132 through 134. In the event that a station line circuit such as station line circuit 112 is scanned, a scanner lead such as lead 135 is pulsed and station line circuit 112 provides an output to lead 113 indicating whether or not the station line loop is bidding for a trunk. Under normal conditions a line circuit such as line circuit 112 maintains its output lead, such as lead 132, in a high (voltage) condition. If the station is on-hook or if station loop 102 is connected to a trunk loop, trunk circuit 112 does not change the high condition output on lead 132 when it is scanned. In the event, however, that the station is off-hook and bidding for a trunk loop when lead 135 is pulsed to scan line circuit 112, the output lead 132 potential is lowered toward ground. This then indicates that station loop 102 is bidding for an available trunk.

In general, matrix 100 functions to interconnect station loops and trunk loops. Matrix 100 comprises a matrix of magnetically responsive mechanical contacts and associated magnetic members composed of ferrite materials. Each of the magnetic members have control windings. A matrix of this type, sometimes called a ferreed matrix, is described in detail in U.S. Pat. No. 3,037,085, which issued to T.N. Lowry on May 29, 1962.

A typical magnetic member and the associated control windings are shown schematically by block 101. It is seen that lead 132 from station line circuit 112 extends to one of the control windings associated with member 101 and then extends by way of this control winding to the control windings of other members and finally to common lead 140. Lead 125 from trunk circuit 115 is connected to the other or second control winding on member 101 and then extends to the "-second" windings on other members and then finally to common lead 140. As disclosed in the Lowry patent, in the event that a sufficient threshold of current is passed through both windings of a magnetic member, the associated group of mechanical contacts close and these contact closures can be utilized to effect the connection of a station loop to a trunk loop. In this example, the closure of the contacts associated with member 101 would connect station loop 102 with trunk loop 105. As further disclosed in the Lowry patent, the mechanical contacts remain closed to maintain the interconnection of the station loop with the trunk loop even after the current passing through the windings terminates. However, if current is passed through one winding and not through the other winding, the mechanical contacts associated with the member are released, opening in turn the connections of the station loop with the trunk loop. The mechanical contacts and the manner in which the station loop is mechanically connected with the trunk loop is not shown in the drawing. Details of the manner in which current is applied to the control windings are disclosed hereinafter, including the operations which are necessary to close the mechanical contacts and to thereafter open the contacts.

Consider now in general the operation of the concentrator and assume that a trunk loop such as trunk loop 105 is available and that a station loop such as station loop 102 is bidding for a trunk. If it further be assumed that line scanner 108 is scanning a station circuit connected to a loop that is not bidding for a trunk, then, as previously described, the output lead of that station circuit is in a high condition. With respect to other line circuits, since they are not being scanned the associated output leads are similarly in high conditions. Accordingly, leads 132 through 134 are all in high conditions and these high conditions are all passed through ferreed matrix 100 to common lead 140. The high condition on lead 140 is applied to common control 110. This indicates to common control 110 that the line scanner is not addressing a bidding line circuit and therefore common control 110 applies a high or enabling potential to gate 130. This enables gate 130 to pass clock pulses to line scanner 108. Thus, line scanner 108 continues to advance and sequentially scan the line circuits so long as it is not addressing or scanning a bidding line circuit.

Assume that line scanner 108 now advances to address line circuit 112. Since we have assumed that line circuit 112 is bidding, output lead 132 goes low. This low condition on lead 140 is then passed again through ferreed matrix 100 to leads 125 through 127. We have further assumed that trunk loop 105 is available and trunk scanner 109 has, presumably, stopped upon addressing trunk circuit 115. Trunk circuit 115 has therefore connected lead 125 to lead 120. Accordingly, the low condition passed by lead 140 to lead 125 is extended to lead 120.

The low condition on lead 140 and applied to common control 110 removes the indication that line scanner 108 is not scanning a bidding line. The low condition on lead 120, however, is also passed to common control 110. This indicates to common control 110 that a bidding line is being addressed or scanned and that in addition a trunk is available to the bidding line. The effect of this condition prompts common control 110 to maintain gate 130 enabled to line scanner 108 thus prepares to advance to address the next line circuit. It is thus seen that line scanner 108 advances if it is either scanning a line circuit not bidding for a trunk or if it is addressing a bidding line and a trunk loop is available to the bidding line.

Return now to the low condition on lead 120. This condition is also passed to pulser 111. After a delay sufficient to permit line scanner 108 to prepare for its next scanning or addressing operation, pulser 111 returns a current pulse to lead 120. This current pulse is then passed by way of trunk circuit 115 to lead 125 and then by way of the second control winding on member 101 through other control windings to common lead 140 and then by way of the first control winding of various members in matrix 100, including the first control winding of lead 101, back to lead 132, which lead it is recalled is in the low condition. The magnitude of this current pulse has a sufficient threshold by way of both windings of member 101 to operate the mechanical contacts associated therewith. Accordingly, station loop 102 is connected to trunk loop 105. Trunk circuit 115 now recognizes that the trunk loop is no longer available and disconnects leads 120 and 125. In addition, with the loop now unavailable, trunk scanner 109 is restarted, as previously described, to scan for the next available trunk. At the same time, line circuit 112 detecting that station loop 102 is connected to trunk loop 105, now stores the indication that the line circuit is no longer bidding for a loop. Output lead 132 is thereafter maintained in a high condition. As previously described, line scanner 108 is now advancing to address the next line circuit. Accordingly, station loop 102 is connected to trunk loop 105 and line and trunk scanning is resumed.

Return now to the connection between station loop 102 and trunk loop 105. When the conversation is completed, the station returns to the on-hook condition. This is detected by conventional means, now shown, in the line circuit and in the trunk circuit, which conventional means effects the disconnection of the station loop from the trunk loop. Thereafter if the station again bids or if the trunk circuit, which is now in the available condition, is again seized (by different trunk or station loops), current will flow to lead 132 from matrix 100 or from lead 125 to the matrix. Thus current flows in either the first (lower) control winding or the second control winding of member 101 but not in both windings. This, as previously described, operates to open the mechanical contacts associated with member 100, restoring the matrix to its initial condition.

It is recalled that line scanner 108 will continue to advance when it addresses a line not bidding for a trunk. Therefore, it it be assumed that no line station circuit is bidding, all of outputs 132 through 134 are maintained high. Common lead 140 is therefore also maintained high and common control 110, in turn, maintains gate 130 enabled. Consequently, line scanner 108 will continue to advance, repeatedly cycling through the station circuits, under the condition that no station is bidding for a trunk loop.

Assume now that none of the trunk loops is available. A high condition is therefore continuously applied to lead 121 by way of resistor R2 to enable gate 129. Trunk scanner 109 therefore continuously scans the trunk circuits under the condition that no trunk is available. With respect to the line circuits, line scanner 108 will continue to advance if no station is bidding for a trunk, as previously described. Assume a station circuit, such as circuit 112, makes a bid for a trunk. In this event, line scanner 108 advances until it addresses bidding line circuit 112. At this time output lead 132 goes low, as previously described. This low condition is passed through matrix 100 to common lead 140 and then to common control 110. Since no trunk is available lead 120 does not concurrently go low. With lead 140 low and lead 120 not concurrently driven low, common control 110 disables gate 130. This blocks the application of clock pulses to line scanner 108 whereby the line scanner stops at the address of the bidding line circuit. Thus line scanner 108 will stop under the condition that no trunk is available and a bidding line is being addressed. It is apparent that when a trunk becomes available the addressed line circuit will seize the trunk, as previously described, and line and trunk scanning will resume.

As previously disclosed, each of the trunk circuits is arranged in substantially the same manner. Considering for example trunk circuit 115, as seen in the drawing, this circuit includes a trunk available detector, generally indicated by block 145, inverter gate 146, diode D3 and relay core K1, together with its associated normally open contact pair. Trunk available detector 145 is a conventional detector arrangement coupled across trunk loop 105. The function of the detector is to detect the connection of the trunk loop to the station loop be recognizing, for example, data signaling on the trunk loop. If trunk available detector 145 determines that trunk loop 105 is not connected to a station loop and therefore available, it applies a high condition to one input of inverter gate 146. Conversely, if trunk loop 105 is connected to a station loop and therefore not available, trunk available detector 145 applies a low condition to inverter gate 146.

Assume first that trunk loop 105 is not available. The low condition applied by detector 145 to inverter gate 146 produces a high output condition. With this high output condition, relay K1 is maintained deenergized. Diode D3 operates to preclude the application of the high condition to lead 121. Accordingly, trunk circuit 115, when addressed by trunk scanner 109, does not lower the potential on lead 121 and, in addition, does not operate relay K1, which in turn maintains leads 125 and 121 disconnected. It is, of course, recalled that with lead 121 in the high condition gate 129 is enabled and trunk scanner 109 proceeds to advance to address the next trunk circuit.

Assume now that trunk loop 105 is available. Trunk available detector 145 now provides a high condition to one input of inverter gate 146. When trunk scanner 109 addresses the trunk circuit 115 a pulse is applied to lead 122. Lead 122 is connected to the other input of inverter gate 146. The application of the pulse to inverter gate 146 produces a low output condition. This low output condition is passed through diode D3 and, in addition, operates relay K1. The low condition on lead 121 now disables gate 129 to stop trunk scanner 109. The operation of relay K1 closes its associated contacts to connect lead 125 to lead 120. As previously described, when a bidding line circuit is scanned, the potential on common lead 140 goes low, lowering the potential on lead 125. With lead 125 connected to lead 120, common control 110 is advised that a trunk has been seized to enable the resumption of line scanning and pulser 111 is operated to thereafter generate a current pulse back over lead 120 to enable ferreed matrix 100 to connect the bidding station loop to the trunk loop. With the trunk loop seized trunk available detector 145 restores its low output condition, returning the output of invertergate 146 to the high condition. Relay K1 is thereby deenergized and the low condition on lead 121 is removed. Gate 129 is thereby reenabled, enabling in turn trunk scanner 109 to advance to address the next trunk circuit.

Each of the line circuits, such as line circuit 112, includes an off-hook detector, generally indicated by block 148 and inverter gate 149. Off-hook detector 148 is a conventional detector arrangement which is connected across the station loop. When the remote data station on station loop 102 is on-hook or, alternatively, when the station loop is connected to a trunk loop, off-hook detector 148 presents a low condition to inverter gate 149. Conversely, when the station is off-hook and bidding for an available trunk, off-hook detector 148 applies a high condition to inverter gate 149.

Assume first that the station terminating loop 102 is on-hook or the station loop is connected to a trunk loop. Under this condition line circuit 112 is not bidding for a trunk and off-hook detector 148 applies a low input condition to inverter gate 149 which, in turn, applies a high condition to lead 132. As previously described, when line scanner 108 addresses station circuit 112, the high condition is maintained on lead 132 and thus common control 110 continues to enable line scanner 108 to advance to address the next line station. If, however, the station is bidding for a trunk, off-hook detector 148 applies a high condition to inverter gate 149. Accordingly, when line scanner 108 addresses the line circuit, a pulse is applied to lead 135, which leads extends to the other input of inverter gate 149. As a consequence, inverter gate 149 produces a low condition on lead 132. This, as previously described, initiates the operation for seizing an available trunk or, assuming the trunk is not available, for stopping line scanner 108.

Common control 110 includes inverters G1 and G2, and diode D2. With common control lead 140 in the high condition it is seen that inverter G1 passes a low condition to inverter G2. Inverter G2 thereupon applies a high condition to gate 130 to enable the gate. This condition prevails, as previously described, when the line scanner is addressing a line circuit which is not bidding for a trunk. In the event, however, that a bidding line is being addressed, lead 140 goes low and inverter G1 removes the low condition applied to the input of inverter G2. If a trunk is available at this time, the low condition on lead 140 is passed on to lead 120, which passes the low condition to diode D2. This low condition is therefore applied to the input of inverter G2, thus applying a high condition to gate 130. Common control 110 accordingly enables gate 130 in the event that a bidding line is addressed and a trunk is available. Finally, if a bidding line is addressed and no trunk is available, lead 140 has a low condition applied thereto and lead 120 does not have a corresponding low condition thereon. Accordingly, inverter G1 does not apply a low condition to inverter G2 and diode D2 blocks the condition provided by lead 120. Since no low condition is passed through to the input of inverter G2, the inverter applies a low condition to gate 130. This disables the gate, stopping the advance of line scanner on the address of the bidding line.

Pulser circuit 111 includes monopulser 151, transformer T1 and diode D1, together with resistor R1. In the normal condition a positive potential is applied by way of resistor R1 to the input of monopulser 151 and to lead 121. This potential also back-biases diode D1. It is recalled that lead 120 is disconnected from leads 125 through 127 until one of the trunks becomes available and is addressed by trunk scanner 109. In the event that a line circuit makes a bid, the potential on leads 125 through 127 drops and this potential is passed to lead 120 by way of the available trunk circuit. This negative-going potential is passed to monopulser 151 and the monopulser thereby generates a pulse which is passed to the primary winding of transformer T1. The negative potential is also passed to common control 110 to enable the subsequent advance of line scanner 108, as previously described. In addition, the low potential removes the back-bias on diode D1. The pulse on the primary winding of transformer T1 is passed to the secondary winding and applied to diode D1. The initial portion of the pulse applied to diode D1 is, however, negative and thereby blocked by the diode. In the terminating portion of the pulse a positive transition occurs and this positive transition provides the necessary current through diode D1 to enable the crosspoint magnetic member to operate the contacts in ferreed matrix 100, as previously described. It is noted that the length of the as provided by monopulser 151 is arranged to provide a delay sufficient to allow common control 110 to prepare line scanner 108 to advance to address the next station circuit.

Although a specific embodiment has been shown and described, it will be understood that various modifications may be made without departing from the spirit and scope of this invention.

I claim:

1. In a concentrator for connecting bidding lines to available trunks, a scanner, means for advancing the scanner to sequentially scan the lines and means responsive to the scanning of a bidding line for seizing an available trunk whereby the line becomes nonbidding and the trunk becomes unavailable, characterized in that means independent of the availability of the trunks enables the advancing means to advance the scanner in response to the scanning of a nonbidding line and other means enables the advancing means to advance the scanner independent of the seizure of a trunk and in response to the scanning of a bidding line and the concurrent availability of a trunk.

2. In a concentrator in accordance with claim 1 wherein each nonbidding line develops a first output condition when scanned and said independent means includes means coupled to the line outputs for enabling the advancing means in response to the development of said first output condition.

3. In a concentrator in accordance with claim 1 wherein each bidding line develops a second output condition when scanned, said other means includes means for enabling the advancing means in response to the development of said second output condition and includes switch means in each trunk responsive to the availability of the trunk for extending the second output condition from the line outputs to said other means.

4. In a concentrator for connecting bidding lines to available trunks, means for scanning the lines to determine whether the lines are bidding or nonbidding, means for advancing the scanner, and means for enabling the advancing means in response to the scanning of a nonbidding line and in response to the scanning of a bidding line and the concurrent availability of a trunk and for disabling the advancing means in response to the scanning of a bidding line and the concurrent absence of an available trunk.

* * * * *